United States Patent [19]
Mallik et al.

[11] 4,443,356
[45] Apr. 17, 1984

[54] LIQUID SCINTILLATION COMPOSITION FOR LOW VOLUME BIOLOGICAL SPECIMENS

[75] Inventors: Arjun Mallik, Pequannock; Harold Edelstein, Fair Lawn, both of N.J.

[73] Assignee: Allied Corporation, Morris Township, Morris County, N.J.

[21] Appl. No.: 418,756

[22] Filed: Sep. 16, 1982

[51] Int. Cl.[3] ........................ C09K 11/06; G01T 1/204

[52] U.S. Cl. ................................ 252/301.17; 250/362; 250/367

[58] Field of Search ................... 252/301.17; 250/362, 250/367

[56] References Cited

U.S. PATENT DOCUMENTS

| | | | |
|---|---|---|---|
| 3,506,828 | 8/1969 | Hansen et al. | 252/301.17 |
| 3,573,219 | 3/1971 | Benson | 252/301.17 |
| 3,999,070 | 12/1976 | Tarkkanen | 252/301.17 |
| 4,001,139 | 1/1977 | Long | 252/301.17 |
| 4,124,527 | 11/1978 | Kauffman | 252/301.17 |

*Primary Examiner*—John F. Niebling
*Attorney, Agent, or Firm*—Webb, Burden, Robinson & Webb

[57] ABSTRACT

A liquid scintillation cocktail especially suitable for low volume biological specimens comprising an aromatic liquid, preferably pseudocumene, for capturing energy from radiation, at least one fluor, preferably PPO and Bis-MSB, and a mixture of anionic and nonionic surfactants. The cocktails are prepared by treating with a cation exchange resin to clarify and with a solid buffer to raise the temperature at which cloudiness develops upon heating.

9 Claims, No Drawings

LIQUID SCINTILLATION COMPOSITION FOR LOW VOLUME BIOLOGICAL SPECIMENS

BACKGROUND

Liquid scintillation counting comprises the addition of a specimen that emits nuclear radiation to an organic liquid mixture which in turn emits light when intercepting the radiation. The organic liquid mixture is often called a "scintillation cocktail." More specifically, in liquid scintillation counting, scintillation cocktails are used to measure the radioactivity of alpha, beta, gamma, and X-ray emitters and thereby their concentrations. A flash of light is detected, for example, by a photocell which is in a circuit that counts the flashes. Generally, the cocktail comprises an aromatic solvent for capturing the energy of the radiation, primary and secondary fluors for converting the energy to a light flash and surfactants to enable the intimate admixture of the cocktail with the specimen. See U.S. Pat. No. 4,124,527 for general background.

The ideal scintillation cocktail would provide a very high degree of efficiency (number of flashes detected for number of radiated particles) over a range of specimen cocktail mixtures and for a large number of specimen types. Formulations that work well with electrolytic specimens tend not to work well with pure water or, say, water and dextrose solutions.

SUMMARY OF THE INVENTION

The liquid scintillation cocktail according to this invention provides high performance when measuring the radioactivity of $^{3}H$, $^{125}I$, $^{32}P$, $^{14}C$ and other radiotagged elements, compounds, solutions or precipitates especially from biological sources where the specimen volume is meager. High efficiency of counting in the presence of physiological isotonic electrolytes is a special feature of this invention; however, the efficiency is more than satisfactory with nonionic specimens.

This invention comprises a liquid scintillation composition including a novel combination of nonionic and anionic surfactants and a carefully selected primary and, optionally, a secondary fluor (fluorescent material) and an aromatic solvent. The composition has the capability of holding a wide range of electrolyte solutions in microemulsion. The electrolyte solutions include, but are not limited to, isotonic saline, albumin in isotonic saline, blood serum or plasma, urine or its equivalent, cerebrospinal fluid or equivalent, aqueous trichloroacetic acid, aqueous bicarbonate and similar biological isotonic fluids.

Briefly according to this invention, there is provided a liquid scintillation composition comprising a phosphorescent aromatic liquid capable of capturing energy from nuclear radiation, at least one fluor, and a mixture of anionic and nonionic surfactants. The composition is prepared by first mixing the aromatic liquid and the surfactants and treating with a cation exchange resin to clarify and then adding the fluors followed by treatment with a solid buffer to adjust the hydrogen ion concentration and thus to raise the temperature at which cloudiness develops in the composition upon warming thereof. Preferably, the aromatic liquid comprises between 500 and 900 parts by weight, the surfactants comprise between 100 and 500 parts by weight, and the fluors comprise between 1 and 25 parts by weight, all parts based on the entire composition equalling 1,000 parts. Preferably, the nonionic surfactants comprise a mixture of alkylaryl polyethers and the anionic surfactants comprise a mixture of alkyl sulfonates including sulfosuccinates and their alkali metal salts. More preferredly the scintillation composition comprises an aromatic liquid selected from the group consisting of pseudocumene, mesitylene, toluene and xylene. The fluorescent or fluor compounds comprise between 1 and 25 parts by weight 2,5-diphenyloxazole (PPO) and, optionally, between 0.1 and 2 parts by weight 1,4-bis-(o-methyl styryl) benzene (Bis-MSB). The nonionic surfactants preferably comprise between 50 and 350 parts by weight octylphenoxy polyethoxy ethanol and between 30 and 270 parts by weight nonylphenoxy polyethoxy ethanol and the ionic surfactants comprise between 10 and 125 parts by weight dioctyl sulfosuccinate and between 10 and 125 parts by weight disodium ethoxylated alcohol half ester of sulfosuccinic acid, all parts based upon the entire composition equalling 1,000 parts.

The composition is preferably prepared by first mixing the aromatic liquid with the surfactants and treating with a sulfonic cationic exchange resin to clarify followed by addition of the fluors and treatment with a solid buffer selected from either $NaH_2PO_4 \cdot H_2O$ and $KH_2PO_4$ to raise the temperature at which cloudiness develops in the mixture upon warming thereof. The phosphate treatment may precede the addition of fluors. Preferably, the octylphenoxy polyethoxy ethanol surfactant analyzes 55 to 75% by weight of ethylene oxide. Most preferably, the nonylphenoxy polyethoxy ethanol analyzes from 45 to 55% by weight ethylene oxide.

DESCRIPTION OF THE PREFERRED EMBODIMENT

Scintillation cocktail compositions were prepared from the batches as set forth in the following Table I.

TABLE 1

| Example | I | II | III | IV |
|---|---|---|---|---|
| Triton X-114 | 9 g | 8 gm | 9 gm | 8 gm |
| Triton N-57 | 7 gm | 6 gm | 7 gm | 6 gm |
| Triton GR7M | 3 gm | 2.5 gm | 3 gm | 2.5 gm |
| Aerosol 102 | 3 gm | 2.5 gm | 3 gm | 2.5 gm |
| Pseudocumene | 80 ml | 80 ml | | |
| Mesitylene | | | 80 ml | 80 ml |

The compositions were mixed in a glass lined vessel or in a stainless steel vessel. After mixing for approximately one hour, the compositions were circulated through an ionic exchange resin for approximately one hour. Thereafter, 0.5 gram of PPO and 0.1 gram of Bis-MSB were added to the compositions and they were mixed for approximately one hour. Thereafter, the mixture including the fluors were circulated through a solid buffer comprising $NaH_2PO_4 \cdot H_2O$ for approximately one hour.

The compositions of Examples I, II, III, and IV were then tested for counting efficiency, when mixed with a radioactive spike of known activity and various quantities of a 5% dextrose solution, 0.9% sodium chloride solution, a 3% trichloroacetic acid (TCA) solution, water and a 1% albumin solution. The results of this testing are set forth in Table II.

TABLE II

| Specimen and Amount | Cocktail of Example I | Cocktail of Example II | Cocktail of Example III | Cocktail of Example IV |
|---|---|---|---|---|
| | (Counting Efficiencies) | | | |
| 1 ml 5% Dextrose | 37.34% | 38.78% | 35.19% | 37.09% |
| 2 ml 5% Dextrose | 35.13% | 34.40% | 29.89% | 23.59% |
| 3 ml 5% Dextrose | 25.05% | 20.21% | 20.35% | 18.07% |
| 1 ml 0.9% NaCl | 36.53% | 38.77% | 35.33% | 36.66% |
| 2 ml 0.9% NaCl | 35.42% | 35.41% | 32.82% | 34.85% |
| 3 ml 0.9% NaCl | 30.38% | 30.59% | 30.53% | 32.18% |
| 1 ml 3% TCA | 31.84% | 33.89% | 29.88% | 32.85% |
| 2 ml 3% TCA | 26.92% | 28.17% | 25.69% | 27.34% |
| 3 ml 3% TCA | 22.30% | 23.32% | 22.03% | 22.83% |
| 1 ml water | 36.13% | 39.76% | 34.91% | 34.88% |
| 2 ml water | 27.06% | 23.31% | 22.50% | 23.76% |
| 3 ml water | 19.62% | 18.45% | 17.42% | 18.95% |
| 1 ml 1% Albumin | 36.31% | 38.54% | 34.19% | 37.19% |
| 2 ml 1% Albumin | 34.64% | 36.14% | 32.68% | 34.15% |
| 3 ml 1% Albumin | 30.26% | 31.32% | 30.11% | 30.91% |

The counting efficiencies set forth in Table II are excellent by comparison to most commercial scintillation cocktails and equivalent to the best commercial cocktail known to applicants.

The compositions of the preferred ingredients of the scintillation cocktails according to this invention and their alternates are set forth in the following Table III.

TABLE III

| Ingredient | Alternates | Remarks |
|---|---|---|
| Triton X-114 | Octylphenoxy Polyethoxy Ethanol of any other brand | HLB # 12.4 ± 1, or EO% = 62 ± 5 |
| Triton N-57 | Any other brand of Nonylphenoxy Polyethoxy Ethanol | HLB # 10.0 ± 1 EO% = 50 ± 5 |
| Triton GR7M | Dioctyl Sulfosuccinate of any other brand | |
| Aerosol 102 | Ethoxylated Alcohol half ester of Sulfosuccinic Acid, mono or disodium salt of any other brand, or: Aerosol 103, or: Aerosol AY 100 and their chemical equivalents | Substitution may result in slightly reduced efficiency |
| Pseudocumene | Mesitylene or Xylene | Substitution may result in slightly reduced efficiency |
| Amberlite | Amberlight IR-120 (Na) after regeneration, or: Rexyn 101, or other sulfonic acid resins | |
| $NaH_2PO_4.H_2O$ | $KH_2PO_4$ | |

The Triton surfactants are the products of the Rohm and Haas Company. The Aerosol surfactants are the products of American Cyanamid. Amberlite is a product of the Rohm and Haas Company.

Having thus described the invention with the detail and particularity required by the patent laws, what is desired protected by Letters Patent is set forth in the following claims.

We claim:

1. A liquid scintillation composition comprising:

a. an aromatic liquid capable of capturing energy from radiation;

b. at least one fluor compound;

c. a mixture of anionic and nonionic surfactants, said nonionic surfactants comprising octylphenoxy polyethoxy ethanol and nonylphenoxy polyethoxy ethanol and the anionic surfactants comprise dioctyl sulfosuccinate and monosodium ethoxylated alcohol half ester of sulfosuccinic acid.

2. A composition according to claim 1 wherein the aromatic liquid comprises between 500 and 900 parts by weight of the entire composition, the surfactants comprise between 100 and 500 parts by weight of the entire composition and the at least one fluor comprises between 0.1 and 25 parts by weight of the entire composition, all parts based upon the entire composition equalling 1000 parts.

3. A liquid scintillation composition comprising:

a. an aromatic liquid selected from the group consisting of pseudocumene, mesitylene toluene and xylene;

b. a fluor compound comprising PPO and, optionally, Bis-MSB or another secondary fluor, and c. a mixture of anionic and nonionic surfactants, said nonionic surfactants comprising octylphenoxy polyethoxy ethanol and nonylphenoxy polyethoxy ethanol and the anionic surfactants comprise dioctyl sulfosuccinate and monosodium ethoxylated alcohol half ester of sulfosuccinic acid.

4. A liquid scintillation composition according to claim 3 wherein the aromatic liquid comprises between 500 and 900 parts by weight of the entire composition; the surfactants comprise between 100 and 500 parts by weight of the entire composition and the fluor compound comprises between 0.1 and 25 parts by weight of the entire composition equalling 1,000 parts.

5. A method of making a liquid scintillation composition comprising the steps for mixing pseudocumene, PPO and, optionally, Bis-MSB and a mixture of anionic and nonionic surfactants consisting of octylphenoxy polyethoxy ethanol comprising 55 to 75% by weight polyoxyethylene, nonylphenoxy polyethoxy ethanol comprising 45 to 55% by weight polyoxyethylene, dioctyl sulfosuccinate, said disodium ethoxylated alcohol half ester of sulfosuccinic acid alkali salt, and composition being prepared by first mixing the pseudocumene and surfactants and treating by contact with sulfonic acid cationic exchange resin and then adding the PPO and, optionally, Bis-MSB.

6. The method according to claim 5 wherein the composition after treating with the ion exchange resin the composition is treated by contact with a solid buffer comprising $NaH_2PO_4 \cdot H_2O$ to adjust the alkali metal content.

7. The method according to claim 5 wherein the pseudocumene comprises between 500 and 900 parts by weight of the entire composition; PPO comprises between 1 and 25 parts by weight of the entire composition; the Bis-MSB optionally comprises between 0.1 and 2 parts by weight of the entire composition; the octylphenoxy polyethoxy ethanol comprises between 50 and 350 parts by weight of the entire composition, the nonylphenoxy polyethoxy ethanol comprises between 30 and 270 parts by weight of the entire composition, the dioctyl sulfosuccinate comprises between 10 and 125 parts by weight of the entire composition and the disodium ethoxylated alcohol half ester of sulfosuccinic acid salt comprises between 10 and 125 parts by weight of the entire composition.

8. A method of making a liquid scintillation composition comprising the steps for:

(1) mixing a. an aromatic liquid capable of capturing energy from radiation, and b. a mixture of anionic and nonionic surfactants, said nonionic surfactants comprising octylphenoxy polyethoxy ethanol and nonylphenoxy polyethoxy ethanol and the anionic surfactants comprise dioctyl sulfosuccinate and disodium ethoxylated alcohol half ester of sulfosuccinic acid, (2) treating the mixture with a cationic exchange resin to clarify, (3) adding the at least one fluor, and (4) treating with a solid buffer to adjust the hydrogen ion concentration thus to raise the temperature at which the cloudiness develops in the composition upon warming thereof.

9. A method according to claim 8 wherein the aromatic liquid comprises between 500 and 900 parts by weight of the entire composition, the surfactants comprise between 100 and 500 parts by weight of the entire composition and the at least one fluor comprises between 0.1 and 25 parts by weight of the entire composition, all parts based upon the entire composition equalling 1000 parts.

* * * * *

UNITED STATES PATENT AND TRADEMARK OFFICE

CERTIFICATE OF CORRECTION

PATENT NO. : 4,443,356

DATED : April 17, 1984

INVENTOR(S) : Arjun Mallik et al.

It is certified that error appears in the above-identified patent and that said Letters Patent are hereby corrected as shown below:

Column 3 Line 46 After "Amberlite" (first occurrence) insert --IR-120 (H)--.

Claim 5 - Column 4 Line 38 "said" should read --and--.

Claim 5 - Column 4 Line 39 "and" should read --said--.

Signed and Sealed this

*First* Day of *January 1985*

[SEAL]

*Attest:*

GERALD J. MOSSINGHOFF

*Attesting Officer* *Commissioner of Patents and Trademarks*